United States Patent [19]

Cushing

[11] 3,976,730

[45] Aug. 24, 1976

[54] METHOD OF EMPLOYING A HIGH PERCENTAGE OF REGROUND THERMOPLASTIC SCRAP RESIN IN AN EXTRUDER

[75] Inventor: Darrell D. Cushing, Greenfield, Mass.

[73] Assignee: Deerfield Plastics Co., Inc., South Deerfield, Mass.

[22] Filed: Apr. 15, 1974

[21] Appl. No.: 460,731

Related U.S. Application Data

[63] Continuation-in-part of Ser. No. 237,258, March 23, 1972, abandoned.

[52] U.S. Cl. ........................... 264/37; 264/40.1; 264/140; 264/176 R
[51] Int. Cl.² ............... B29C 29/00; B29D 3/00
[58] Field of Search ............... 264/37, DIG. 69, 115, 264/165, 40, 176 R, 140–143, 94, 349

[56] References Cited
UNITED STATES PATENTS

| | | | |
|---|---|---|---|
| 2,540,146 | 2/1951 | Stober | 264/211 |
| 3,342,901 | 9/1967 | Kosinsky et al. | 264/349 |
| 3,344,218 | 9/1967 | Chopra et al. | 264/37 |
| 3,418,694 | 12/1968 | Strauss | 264/37 |
| 3,459,840 | 8/1969 | Wood | 264/37 |
| 3,535,408 | 10/1970 | Ronden | 264/37 |
| 3,672,803 | 6/1972 | Rees | 264/37 |

FOREIGN PATENTS OR APPLICATIONS

| | | | |
|---|---|---|---|
| 1,185,802 | 1/1965 | Germany | 264/37 |
| 7,002,188 | 8/1971 | Netherlands | 264/37 |

*Primary Examiner*—Willard E. Hoag
*Attorney, Agent, or Firm*—Richard P. Crowley

[57] ABSTRACT

Method of employing a high percentage of reground polyethylene resin scrap in an extruder, wherein fluffy, low-density, polyethylene scrap resin is preferably admixed with a granular high-density polyethylene virgin resin, and the admixture fed by gravity into a first feed inlet in a screw-type conveyor, and granular polyethylene virgin resin fed by gravity into a second feed inlet generally adjacent to and downstream or the first feed inlet of the extruder. The admixture fed to the first feed inlet is insufficient to fill the volume of the extruder tube, while the virgin resin automatically fed by gravity fills up the total volume in the extruder tube, thereby preventing starvation of the resin to the extruder die in the event of blockage of the fluffy scrap resin, which technique permits high amounts of from 20 to 40% of scrap resin to be blended with virgin resin.

22 Claims, 2 Drawing Figures

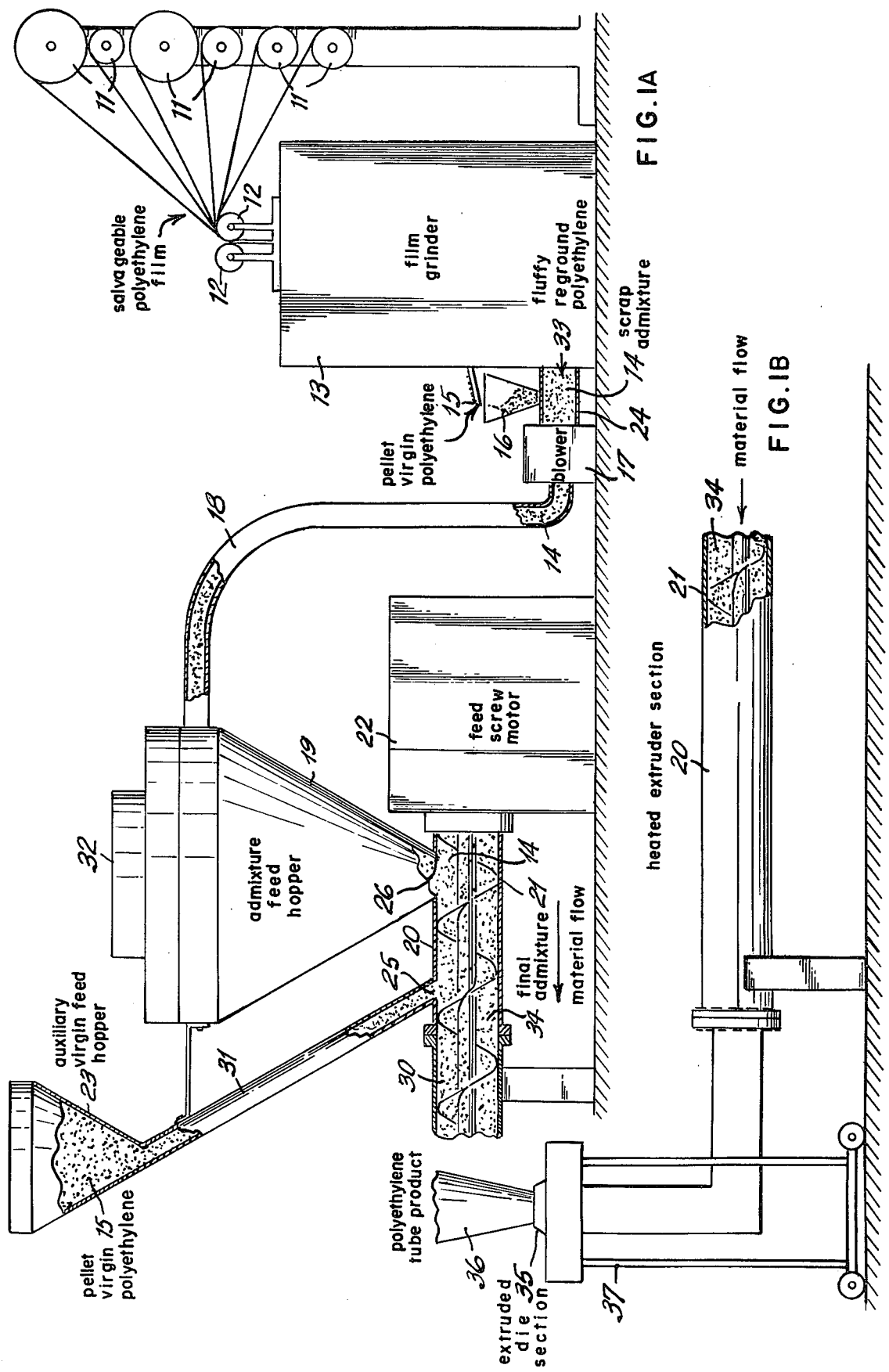

METHOD OF EMPLOYING A HIGH PERCENTAGE OF REGROUND THERMOPLASTIC SCRAP RESIN IN AN EXTRUDER

REFERENCE TO PRIOR APPLICATION

This application is a continuation-in-part of U.S. Ser. No. 237,258, filed Mar. 23, 1972 now abandoned.

BACKGROUND OF THE INVENTION

The employment of scrap thermoplastic resins in an extrusion process is a common method of efficiently and profitably recycling scrap resin. Typically, the scrap resin material is ground up and then fed into a screw-type extruder through a feed hopper, and often in admixture with a virgin resin material. By such recovery and recycle techniques, scrap-to-virgin resin ratios above to about 20% or higher have been reported; however and typically, the scrap-to-virgin resin ratios usually obtained have been up to about 10%, and more generally 5%.

One prime difficulty in the recycle of scrap polyethylene resin, or a similar resin, is that, on regrinding of the solid resin, the resin becomes a very low-density, fine particle-size, fluffy material. The reground resin is thus difficult to feed in a feed hopper in a continuous manner to an extruder, and, further, is difficult, by virtue of the difference in density, to admix properly with a granular virgin resin for a proper and continuous feed to an extruder. Thus, when the fluffy scrap resin, alone or with virgin resin, is attempted to be fed at high ratios into an extruder, quite often blockage of the feed hopper occurs, with the result that the extruder die is then starved for resin material. Such difficulties have often resulted in expensive down time for the extruder, while restricting the practical amount of the scrap resin to be employed in a recycling process to not more than 5%. Thus, there exists a need for an apparatus and method by which thermoplastic scrap resin material, such as polyethylene, may be effectively and efficiently employed in an extruder at high ratios, without the difficulties occasioned by the prior art.

SUMMARY OF THE INVENTION

My invention relates to an apparatus for and method of efficiently and profitably employing scrap thermoplastic resin in an extruder. In particular, my invention relates to an apparatus for and a method of employing a high percentage of a thermoplastic scrap resin, such as reground polyethylene scrap resin, with additional virgin thermoplastic resin, such as virgin polyethylene scrap resin, in a screw-type extruder.

My invention provides for the profitable and effective utilization of scrap resin at much higher ratios than that achieved by the prior art, and, for example, greater than 10% and typically from 20 to 40% or higher. My discovery overcomes many of the disadvantages of the prior art in the use and handling reground scrap resin, while preventing the starvation of an extruder die of an extruder by the blockage of feed of the low-density, fluffy, reground resin scrap. In my invention, the blockage of the feed of the fluffy scrap resin, alone or in admixture with virgin resin granules, does not result in the starvation of the extruder die of the extruder, which, in the past, has limited conventional extruders and recycle techniques through the use of very low ratios of scrap-to-virgin resin in practice.

My apparatus includes a means to regrind a solid scrap resin material, such as an olefinic resin like polypropylene or polyethylene resin, into the form of a fine particle-size material characterized by very low density and a fluffy snow-like nature. In my invention, the reground scrap resin may be used alone, or preferably admixed with an additional virgin thermoplastic resin of the same or different resin from the same or different source. Preferably, the virgin resin is the same or similar in composition, and derived from a common source, such as the same or similar extruding machine or process. The reground resin or admixture is then conveyed, such as by a blower, into a feed hopper or other storage bin, preferably a cyclone-type truncated hopper. The reground scrap resin or a combination of the scrap resin and virgin resin material is then fed from the feed hopper by gravity or a low-pressure difference into a first feed inlet into the tube of a single or multiple screw extruder. The extruder typically comprises an extruder barrel having a rotating lead screw housed therein to form a mixing and compressing section, and later a heated extrusion section wherein the resin is heated to a molten stage, and then through an extrusion die wherein the heated or molten resin is extruded into a product, such as a blown tubular form in one embodiment, to be slit subsequently and formed into a thermoplastic thin-film roll. In the extruder, rotation of the lead screw therein in the mixing and compressing sections compresses the plastic material and propels it forward. The fluffy scrap resin material often has a tendency, because of its low density and resistance to flow, to become compressed and blocked in the feed hopper throat, thereby starving the extruder die for resin material. Although this may happen infrequently in the prior art, such blockages are annoying, time-consuming and expensive.

The scrap resin or admixture fed to the barrel of the extruder is in such a quantity as to be insufficient to fill completely the volume of the lead screw tube, and typically fills about 40 to 70% of the lead screw. Of course, if too much resin is fed into the lead screw; that is, greater than the output of the extruder die, then backup of the scrap resin or admixture occurs in the feed hopper.

My apparatus contains a second or auxiliary feed hopper adapted to contain a granular thermoplastic resin material, such as a medium or low-density virgin polyethylene resin in pellet or granular form, but typically of the same or similar-type resin as that admixed with the fluffy scrap resin after regrinding. At a further distance generally adjacent to and quite close to the first feed inlet along the barrel, there is provided a second feed inlet for the introduction, typically by gravity, of the virgin resin material from the second feed hopper into the extruder. The granular virgin resin material from the auxiliary hopper is fed into the second feed inlet to fill all or substantially all of the volume of the barrel. The relationship and position of the first and second feed inlets to the mixing and compressing sections of the extruder is such that the second feed inlet is positioned at least one helical turn distance, and often nor more than three helical turns distance, from the first feed inlet. The fluffy snow-like resin from the first feed hopper fed into the lead screw is quickly compressed and reduced in volume by one helical turn of the screw, permitting the feed of additional fluffy scrap resin from the first hopper, and permitting the easy introduction by gravity of the virgin resin material from the second feed hopper in the second feed inlet. Due to the low density and fluffy characteristics of the scrap resin or admixture, the opening of the first feed inlet is preferably larger, such as from two to four times, than the area of the second feed inlet, wherein easy-to-handle, colored or granular-type virgin plastic material of high density is introduced into the lead screw. The size of the respective openings and the positions thereof, therefore, permit the proper feed of the scrap and virgin material, while permitting a void in the volume of the barrel between the first and second feed inlets sufficient to permit the automatic feed by gravity of the virgin material into the extruder. Further and importantly, the first feed hopper is preferably a cyclone or conical-type hopper so that the fluffy scrap material is urged by gravity and the low pressure in the feed throat easily into the extruder tube. The scrap and virgin material which may be same or of a slightly different size, for example, ranging from 1/16th of an inch to ¼th of an inch in average particle size, is of considerable; e.g., 3 to 10 times, difference in density.

The entire admixture of the scrap and the virgin resin material so introduced into the lead screw is fed by the rotation of the lead screw after mixing and compressing into a heating section of the extruder barrel, where the compressed and mixed blend is heated to a temperature for extrusion, and then subsequently into an extrusion die wherein the heated material is extruded into the desired form.

In the event that the first feed hopper containing a scrap resin material becomes temporarily blocked due to the lack of sufficient density of the scrap material, my discovery permits the extrusion die to continue in full production, since the amount of virgin resin fed from the second feed hopper into the extruder will increase automatically to fill the void in the feed tube caused by the blockage; thus, permitting the continuous operation of the extruder. The virgin resin fed from the second or auxiliary feed hopper, therefore, makes up in quantity for the amount of scrap and/or virgin resin which has been temporarily blocked from feeding into the extruder from the first hopper. By my apparatus and method, the costly starveouts of the extruder die and production shutdowns are prevented, since the use of high scrap content in the feed inlet of conventional extruder machines increases the likelihood of such resin starveouts of the extruder die, and conventional extruders and scrap-recycling techniques are limited to low scrap ratios of the virgin material.

In my invention, the salvagable resin may be fed into the grinding means in any form suitable for grinding, while the admixture of the granular virgin resin with the low-density reground resin may vary as desired, but typically ranges in a scrap-to-virgin resin ratio of from about 1:1 to 6:1, but particularly, from about 2-4:1, such that the amount of scrap material in the final extruded product is greater that 20% or as high as tolerable, depending on the extrusion speed, resin and other factors.

My apparatus and method will be described for the purposes of illustration only in connection with the employment of a polyethylene scrap resin and virgin resin admixtures in a single screw-type extruder. However, as will be apparent to those skilled in the art, various and obvious changes may be made in the various embodiments of the invention as illustrated, and it is not intended that the matter contained herein and as described in the specific embodiments be so limited in scope.

BRIEF DESCRIPTION OF THE DRAWINGS

My invention and the objects and features thereof may be understood with reference to the following detailed description of an illustrative embodiment of my apparatus in the drawings in which:

FIG. 1A is a partial diagrammatic sketch of my apparatus for the grinding of scrap resin and the feeding of scrap resin and a virgin resin admixture into an extrusion die in accordance with my invention; and FIG. 1B is a partial diagrammatic sketch of the remainder of the diagrammatic sketch of FIG. 1A.

DESCRIPTION OF THE PREFERRED EMBODIMENTS

FIG. 1A and FIG. 1B illustrate an apparatus in which rolls 11 of polyethylene resin material to be salvaged are fed by feed rolls 12 into grinder 13 wherein the sheet material is ground into a low-density, fine particle-size fluff material; e.g., about ⅛th of an inch in size. The reground polyethylene material 33 flows into exit tube 24 where it is mixed with hard, high-density, pellet or granular virgin plastic material 15, fed into hopper 16, and into exit tube 24. The ratio of virgin material to scrap material at this stage is preferably in the order of one part of virgin material to 3.5 to 4.5; e.g., 4, parts of scrap ground material, forming the mixture 14 in tube 24.

Blower unit 17 draws in the mixture of material 14 and ejects it through exhaust tube 18 into hopper 19 where it flows by gravity to the hopper throat and feed inlet 26 leading into the extruder barrel 20. Feed screw 21, rotating in barrel 20, is rotated by motor unit 22. The feed screw 21 acts to mix, compress and force the material in tube 20 to the extruder heater and die section 35 as shown in FIG. 1B.

Pellet virgin polyethylene resin; e.g., a low or medium-density resin like the resin 15, is added to auxiliary feed hopper 23 where it flows by gravity through tube 31 to throat 25 joining barrel 20 to mix with the initial mixture 14 of scrap and virgin material in the tube, forming mixture 34.

Under normal operation, the ratio of virgin material added by the auxiliary hopper 23 to the mixture 14 in the barrel 20 is in the ratio of one part of virgin material 15 to one part of mixture 14, resulting in a mixture 34 which is composed of about six parts of virgin material to four parts of reground scrap material. Mixture 34 is fed through barrel 20 by feed screw 21 to extrusion die unit 35, mounted on support unit 37, where the material 34 is extruded into plastic products 36.

As illustrated, the feed hopper 19 comprises a cyclone or conical-type hopper having tapered sides leading to the first feed inlet or hopper throat 26, where by virtue of the blowing of the scrap resin into the feed hopper, there is a pressure difference which induces movement of the scrap admixture 14 from the hopper 19 through the flute 26 and into the barrel 20. As illustrated, the feed hopper 19 is positioned such that the throat communicates directly with the feed inlet, while the first feed inlet and throat of the hopper 26 is upstream of and adjacent to the second inlet from the gravity feed of hopper 23 for the virgin material 15. Typically, the throat section 26 would have an area two to six times greater than the second feed inlet area 25 in order to permit passage of the fluffy scrap admixture into the barrel 20. In one illustrated embodiment, the hopper 26 would comprise a generally rectangular opening of about 6 by 4 inches, while the second feed inlet or throat 25 would comprise a circular inlet of about 3 to 4 inches in diameter, with the distance between the centers of the first and second throats in a single extruder being about 6 inches.

It is not unusual for the fine fluff of the reground scrap material in hopper 19 to separate from the heavier virgin material in the hopper 19 and to block up the throat of the hopper, causing the incoming material in tube 18 to back up and flow out of the hopper top 32. In conventional apparatus, such blockage would prevent sufficient material from flowing into the barrel 20 to force properly sufficient material through the extrusion die unit 35, a condition known as extruder starveout. Such a condition is very costly because the material in the extruder die area becomes overheated and must be scrapped, resulting in expensive down time for the machine.

With the apparatus of my invention, a blockage of adequate flow from hopper 19 of mixture 14 of scrap and virgin plastic is compensated for by an automatic increase of flow of virgin pellets 15 from auxiliary hopper 23 feeding through throat 25 into barrel 20. This increased flow of virgin material 15 occurs since the barrel 20 is fed automatically by gravity from hopper throat 25, with the limit on the feed of virgin material 15 from hopper 23 being the actual filling of volume of the barrel 20 under throat 25.

The difference in positions between the throats 25 and 26 as illustrated of one helical turn permits the fluffy resin admixture 14 to be compressed and reduced in volume prior to the introduction of the virgin resin 15. It is essential in my invention that the fluffy scrap resin be added to the first feed inlet and compressed at least in part by the lead screw prior to the introduction of the virgin resin.

The blockage of the scrap mixture 14 in hopper 19 does not cause extruder starveout, and the extrusion die 35 continues in operation during such a blockage in hopper 19. Blockage in hopper 19 may be cleared by temporarily stopping blower 17 and allowing the material in hopper 19 to settle together or separately with necessary manual agitation of the contents of hopper 19. After the blockage has been cleared, the grinder unit 13 and the blower unit 17 may be restarted to resume the original feeding schedule. During this interruption, the extrusion process continues, with the only change during the blockage being the temporarily increased ratio of virgin material to scrap material utilized in the finished product.

What is claimed is:

1. A process for the use of high amounts of a fluffy, low-density, scrap resin in an extruder, which extruder comprises a barrel with a rotating helical lead screw therein and an extruder die at one end thereof, and characterized by a first feed inlet and a second feed inlet downstream of the first feed inlet, which process consisting essentially of:
   a. introducing into the first feed inlet of the barrel a fluffy, thermoplastic, scrap resin which tends occasionally to plug the first feed inlet;
   b. moving the fluffy scrap resin in the barrel downstream to the second feed inlet by the rotating helical movement of at least one helical screw length of the lead screw;
   c. introducing continuously and automatically by gravity feed into the second feed inlet and into the unoccupied volume of the extruder barrel a granular, thermoplastic, virgin resin in pellet form in an amount sufficient to keep the extruder barrel substantially full of resin at all times during the extruder operation when the fluffy resin plugs the first feed inlet, so that, in the event of any blockage of the fluffy resin in the first feed inlet, resin starvation of the extruder die is prevented by the introduction of needed high-density resin into the second feed inlet of the barrel; and
   d. extruding the scrap-virgin thermoplastic resin admixture.

2. A process for using fluffy thermoplastic scrap as extruder feed consisting essentially of:
   a. grinding thermoplastic resin scrap into a fine fluffy material of a character having a tendency to block an extruder barrel feed inlet;
   b. feeding said material directly into an extruder barrel first feed inlet in an amount insufficient to fill the extruder barrel;
   c. feeding a second thermoplastic resin in pellet form into a second feed inlet in the extruder barrel, said second feed inlet being downstream from the first inlet and spaced therefrom by at least one helical screw length, said pellets being introduced automatically by gravity feed in an amount sufficient to keep the extruder barrel substantially full of resin at all times; and
   d. extruding the scrap resin and second resin as a mixture through an extruder die, whereby starvation of the extruder die is prevented in the event of plugging of the first extruder inlet.

3. The process of claim 2 wherein the thermoplastic resin is an olefinic resin.

4. The process of claim 2 wherein the thermoplastic resin is a polyethylene resin.

5. The process of claim 2 wherein the scrap resin is derived from the operation of a film extruder.

6. The process of claim 2 which includes the step of mixing the ground fluffy resin scrap with a granular thermoplastic resin of higher density to obtain an admixture in a ratio of scrap-to-virgin resin of from about 1:1 to 6:1, and feeding the admixture into the first feed inlet.

7. The process of claim 2 wherein the amount of granular resin and fluffy scrap resin employed in the process provides for an extruded product when the first feed inlet is not plugged by scrap resin comprising from about 20 to 40% by weight of scrap resin.

8. The process of claim 2 wherein the scrap resin is admixed with high-density virgin resin and, after being fed into the feed inlet and compressed in the barrel, comprises an admixture of scrap resin and virgin resin, which occupies at least one-half of the volume of the barrel of the extruder.

9. The process of claim 2 which includes the step of extruding the mixture through an extrusion die into a thin blown tube product.

10. The process of claim 2 which includes blowing the scrap resin into a first inverted cyclone feed hopper having a throat outlet which directly communicates with the first feed inlet of the extruder.

11. The process of claim 2 wherein the scrap thermoplastic resin to be ground into fluffy, low-density, scrap resin is derived from thin-film scrap resin.

12. The process of claim 2 which includes conveying the fluffy ground scrap resin after grinding to a first feed hopper by blowing air to convey the fluffy scrap resin through a tube and into the first feed hopper, and feeding the fluffy resin by gravity from the first feed hopper to the first feed inlet.

13. The process of claim 2 wherein a throat area of the first feed inlet is from about two to six times a throat area of the second feed inlet.

14. The process of claim 2 which includes feeding the scrap resin in combination with a granular virgin resin pellets into a first feed inlet, and filling about 40 to 70% of the extruder barrel volume with the mixture.

15. The process of claim 2 wherein the density of the high-density resin is from about 3 to 10 times greater that that of the low-density scrap resin.

16. The process of claim 2 wherein the second and first feed inlets are spaced apart by a distance of from about one to three lead screw lengths.

17. The process of claim 2 wherein the fluffy scrap and pellets resin has an average particle size ranging from about 1/16th to ¼th an inch.

18. The process of claim 2 wherein the resin pellets are a virgin thermoplastic resin in pellet form.

19. The process of claim 2 wherein the extruder product when the first feed inlet is not plugged by the scrap resin comprises more than about 10% by weight of scrap resin.

20. The process of claim 2 wherein the fluffy scrap and pellet resin are fed into the respective feed inlets by gravity.

21. A process for the use of a high amount of fluffy scrap polyethylene resin in an extruder, which process consists essentially of:
a. grinding salvageable polyethylene resin film into a fine particle-size, fluffy, polyethylene resin scrap of low density of a character having a tendency to block an extruder barrel feed inlet;
b. mixing the ground polyethylene resin scrap with granular virgin polyethylene resin to obtain an admixture of scrap-to-virgin resin having a ratio of from about 1:1 to 6:1;
c. conveying the admixture into a first cyclone-type feed hopper having a throat outlet;
d. feeding the admixture from the cyclone hopper automatically by gravity or low-pressure difference through the throat outlet directly into a first feed inlet in a barrel of a screw-type extruder, the amount of the admixture fed into the barrel of the extruder being insufficient to fill the barrel, and which admixture tends occasionally to plug the throat outlet of the cyclone hopper:
e. feeding a virgin granular polyethylene resin by gravity from a second auxiliary feed hopper into a second feed inlet in the tube of the extruder, the second feed inlet downstream of and positioned about one to three helical screw lengths from the first feed inlet, the virgin material fed in an amount sufficient to keep the barrel automatically filled to the extruder die with the resin at all times when the throat outlet is plugged with the admixture, so that irregular blockage in the throat area of the first feed hopper by the fluffy scrap resin will not resin-starve the extruder die, the throat area of the first feed inlet being larger in throat diameter than the throat area of the second feed inlet and second throat area from the second feed hopper; and
f. compressing, heating and extruding the admixture and the polyethylene virgin resin to produce continuously an extruded product, said product containing a high percentage of scrap polyethylene resin when the first feed inlet is not plugged.

22. The process of claim 21 which includes:
a. grinding salvagable polyethylene resin in film form into fluffy polyethylene resin scrap of low density; and
b. conveying an admixture of scrap resin and virgin pellet resin after grinding and mixing to a first feed hopper by blowing air through a tube which conveys the admixture into the first feed hopper, and by gravity to the first feed inlet.

* * * * *